(12) United States Patent
Xu et al.

(10) Patent No.: US 11,553,395 B2
(45) Date of Patent: Jan. 10, 2023

(54) DATA TRANSMISSION METHOD, APPARATUS AND TERMINAL

(71) Applicant: Guangdong OPPO Mobile Telecommunications Corp., Ltd., Guangdong (CN)

(72) Inventors: Yang Xu, Dongguan (CN); Jianhua Liu, Dongguan (CN)

(73) Assignee: GUANGDONG OPPO MOBILE TELECOMMUNICATIONS CORP., LTD., Gaungdong (CN)

( * ) Notice: Subject to any disclaimer, the term of this patent is extended or adjusted under 35 U.S.C. 154(b) by 0 days.

(21) Appl. No.: 17/125,827

(22) Filed: Dec. 17, 2020

(65) Prior Publication Data

US 2021/0105697 A1    Apr. 8, 2021

Related U.S. Application Data

(63) Continuation of application No. PCT/CN2019/078774, filed on Mar. 19, 2019.

(30) Foreign Application Priority Data

Nov. 28, 2018  (CN) ................. PCT/CN2018/118028
Mar. 5, 2019   (CN) ................. PCT/CN2019/077060

(51) Int. Cl.
*H04W 48/18*      (2009.01)
*H04W 40/02*      (2009.01)
(Continued)

(52) U.S. Cl.
CPC ........... *H04W 40/02* (2013.01); *H04W 48/18* (2013.01); *H04W 76/12* (2018.02); *H04W 76/16* (2018.02); *H04W 88/06* (2013.01)

(58) Field of Classification Search
CPC ..... H04W 40/02; H04W 48/18; H04W 76/12; H04W 76/16; H04W 88/06; H04W 76/15;
(Continued)

(56) References Cited

U.S. PATENT DOCUMENTS

2017/0207884 A1   7/2017  Jiang et al.
2018/0270729 A1   9/2018  Ramachandra et al.
(Continued)

FOREIGN PATENT DOCUMENTS

CN    107682128 A    2/2018
CN    107801243 A    3/2018
(Continued)

OTHER PUBLICATIONS

ISR for International application PCT/CN2018/118028 dated Mar. 27, 2019.
(Continued)

*Primary Examiner* — Julio R Perez
(74) *Attorney, Agent, or Firm* — Perkins Coie LLP

(57) ABSTRACT

Embodiments of this application provide a data transmission method and apparatus and a terminal. The method includes: performing, by a terminal, a first action according to first information, where the first action is that at least one user module of the terminal transmits a same piece of application data through a plurality of connections.

10 Claims, 14 Drawing Sheets

(51) Int. Cl.
*H04W 76/12* (2018.01)
*H04W 76/16* (2018.01)
*H04W 88/06* (2009.01)

(58) Field of Classification Search
CPC ..... H04W 76/14; H04W 24/02; H04W 24/08; H04W 28/04; H04W 8/24; H04W 72/0406; H04W 80/02; H04W 80/10; H04L 45/24; H04L 1/22; H04L 1/08
See application file for complete search history.

(56) References Cited

U.S. PATENT DOCUMENTS

| | | | | |
|---|---|---|---|---|
| 2019/0387535 | A1* | 12/2019 | Kim | H04L 69/14 |
| 2020/0113013 | A1* | 4/2020 | Kim | H04L 5/0035 |
| 2020/0288384 | A1* | 9/2020 | Li | H04W 24/02 |
| 2021/0058826 | A1* | 2/2021 | Mao | H04W 28/0808 |
| 2021/0105837 | A1* | 4/2021 | Lee | H04W 76/11 |
| 2021/0127297 | A1* | 4/2021 | Wang | H04W 28/0268 |
| 2021/0384922 | A1* | 12/2021 | Ye | H03M 13/6306 |

FOREIGN PATENT DOCUMENTS

| | | |
|---|---|---|
| CN | 108347314 A | 7/2018 |
| CN | 108667572 A | 10/2018 |
| WO | 2018086121 A1 | 5/2018 |
| WO | 2018/133860 A1 | 7/2018 |

OTHER PUBLICATIONS

S2-1812087 Huawei, HiSilicon update to Solution#3 and Solution#4.
S2-1812162 Huawei, HiSilicon, MediaTek Inc. et al Correction for URSP rule parameter traffic descriptor.
ISR for International application PCT/CN2019/078774 dated Aug. 5, 2019.
3GPP TR 23.725 V0.2.0 (Jun. 2018).
First Office Action of the Chinese Application No. 2020106959898 dated May 31, 2021.
European Search Report dated Jun. 21, 2021 from European Application No. 19888991.7.
3GPP TR 23.725 v1 .1.0, "Study on enhancement of Ultra-Reliable Low-Latency Communication (URLLC) support in the 5G Core network" Oct. 2018.
3GPP TR 23.793 v1 .1.0 "Study on Access Traffic Steering, Switching and Splitting support in the 5G system architecture" Oct. 2018.
Examination Report for Indian Application No. 202027044595 dated Sep. 15, 2021. 6 pages with English translation.
Examination Report No. 1 for Australian Application No. 2019390331 dated Sep. 23, 2021. 4 pages.
Second Office Action for Chinese Application No. 202010695989.8 lated Sep. 2, 2021. 11 pages with English translation.
Decision of Rejection for Chinese Application No. 202010695989.8 dated Dec. 9, 2021. 28 pages with English translation.
Examination Report for Canadian Application No. 3108588 dated Feb. 2, 2022. 3 pages.
Examination Report for European Application No. 19888991.7 dated Feb. 23, 2022. 5 pages.
Huawei et al. "Description of components in URSP" Change Request 23.503; S2-180129; 3GPP TSG-SA WG2 Meeting #125; Gothenburg, Sweden, Jan. 22-26, 2018. 4 pages.
Huawei et al. "Description of components in URSP" Change Request 23.503; S2-180966; 3GPP TSG-SA WG2 Meeting #125; Gothenburg, Sweden, Jan. 22-26, 2018. 4 pages.
Huawei et al. "Description of components in URSP" Change Request 23.503; S2-181041 ; 3GPP TSG-SA WG2 Meeting #125; Gothenburg, Sweden, Jan. 22-26, 2018. 4 pages.
Huawei et al. "Description of components in URSP" Change Request 23.503; S2-181697; 3GPP TSG-SA2 Meeting #126; Montreal, Canada, Feb. 26-Mar. 2, 2018. 4 pages.
Examination Report for European Application No. 19888991.7 dated Aug. 1, 2022. 4 pages.
Notice of Reasons for Refusal for Japanese Application No. 2021-523393 dated Jun. 7, 2022. 6 pages with English translation.
Notification of Reexamination for Chinese Application No. 202010695989.8 dated Jun. 6, 2022. 28 pages with English translation.
Decision on Reexamination for Chinese Application No. 202010695989.8 dated Sep. 30, 2022. 39 pages with English translation.
Examiner's Report for Canadian Application No. 3108588 dated Sep. 14, 2022. 4 pages.

* cited by examiner

DATA TRANSMISSION METHOD, APPARATUS AND TERMINAL

CROSS-REFERENCES TO RELATED APPLICATIONS

This application is a continuation of and claims priority to International Patent Application PCT/CN2019/078774, filed on Mar. 19, 2019, which claims priority to International Patent Applications PCT/CN2018/118028, filed Nov. 28, 2018, and PCT/CN2019/077060, filed Mar. 5, 2019, the contents of which are hereby incorporated by reference in their entirety.

BACKGROUND OF THE INVENTION

Technical Field

Embodiments of this application relates to the field of mobile communications technologies, and specifically, to a data transmission method and apparatus and a terminal.

Related Art

To meet people's pursuit of service speed, latency, high-speed mobility, and energy efficiency and deal with diversity and complexity of services in further life, the 3rd Generation Partnership Project (3GPP) international standards organization starts to research and develop 5th Generation (5G) mobile communications technology.

One application scenario of the 5G mobile communications technology is ultra-reliable low-latency communications (URLLC). To ensure user experience of URLLC services, a terminal needs to perform redundant transmission on a same data source. How to perform such redundant transmission is a problem to be resolved.

SUMMARY OF THE INVENTION

Embodiments of this application provide a data transmission method and apparatus and a terminal.

A data transmission method provided in an embodiment of this application includes performing, by a terminal, a first action according to first information, where the first action is that at least one user module of the terminal transmits a same piece of application data through a plurality of connections.

A data transmission method provided in an embodiment of this application includes determining, by a terminal, according to attribute parameters of a session in an establishment request, whether to perform a first action, where the first action is that at least one user module of the terminal transmits a same piece of application data through a plurality of connections.

A data transmission apparatus provided in an embodiment of this application includes a transmission unit, configured to perform a first action according to first information, where the first action is that at least one user module of the terminal transmits a same piece of application data through a plurality of connections.

A data transmission apparatus provided in an embodiment of this application includes a determining unit, configured to determine, according to attribute parameters of a session in an establishment request, whether to perform a first action, where the first action is that at least one user module of the terminal transmits a same piece of application data through a plurality of connections.

A terminal provided in an embodiment of this application includes a processor and a memory. The memory is configured to store a computer program, and the processor is configured to invoke and run the computer program stored in the memory, to perform the foregoing data transmission method.

A chip provided in an embodiment of this application is configured to implement the foregoing data transmission method.

Specifically, the chip includes a processor, configured to invoke a computer program from a memory and run the computer program, to cause a device in which the chip is installed to perform the foregoing data transmission method.

A computer-readable storage medium provided in an embodiment of this application is configured to store a computer program, the computer program causing a computer to perform the foregoing data transmission method.

A computer program product provided in an embodiment of this application includes a computer program instruction, the computer program instruction causing a computer to perform the foregoing data transmission method.

An embodiment of this application provides a computer program, the computer program, when being run on a computer, causing the computer to perform the foregoing data transmission method.

In the foregoing technical solutions, a network side instructs, by using first information, a terminal to perform redundant transmission (namely, a first action); or the terminal determines, according to attribute parameters of a session, whether to perform redundant transmission (namely, the first action). In addition, the first action has two implications, one is for a user module, and the other is for a session. The first action may implement that one user module of the terminal transmits a same piece of application data by using a plurality of sessions, and may also implement that a plurality of user modules of the terminal transmit a same piece of application data by using a plurality of sessions, so that the terminal can control the redundant transmission.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings.

DETAILED DESCRIPTION OF THE INVENTION

The technical solutions of embodiments of this application will be described in the following with reference to the accompanying drawings in the embodiments of this application. It is obvious that the embodiments to be described are some rather than all of the embodiments of this application. All other embodiments obtained by a person of ordinary skill in the art based on the embodiments of this application without creative efforts shall fall within the protection scope of this application.

The technical solutions of the embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a 5G system.

Figure 1:
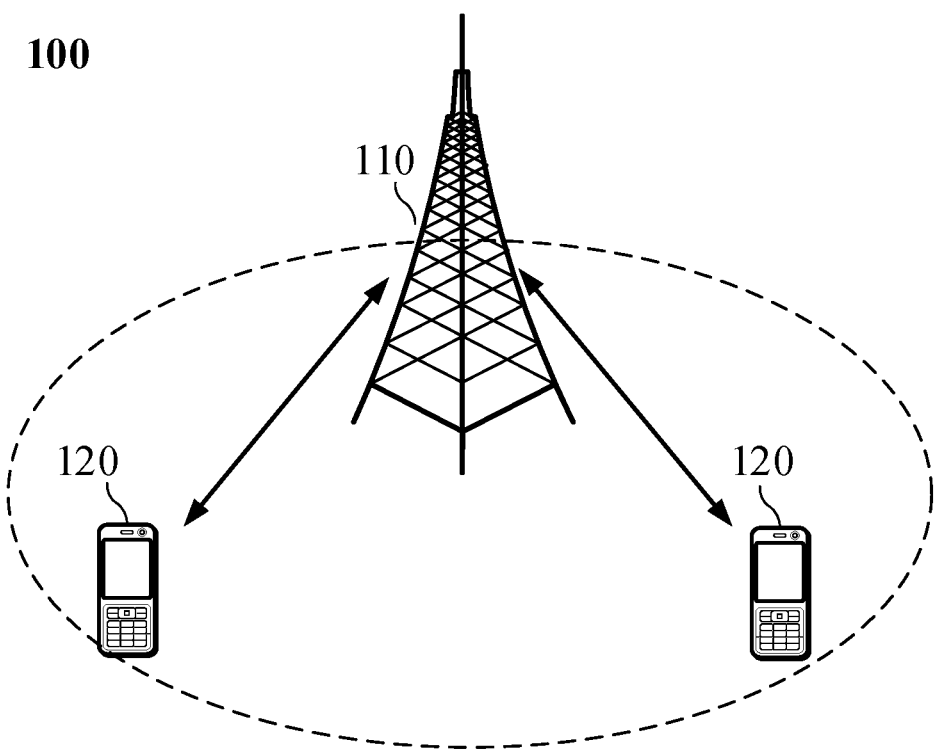
FIG. 1 is a schematic diagram of an architecture of a communications system according to an embodiment of this application.

For example, a communications system 100 to which the embodiments of this application are applied is shown in FIG. 1. The communications system 100 may include a network device 110. The network device 110 may be a device communicating with a terminal 120 (or referred to as a communications terminal or a terminal). The network device 110 may provide communication coverage for a particular geographical area, and may communicate with a terminal located in the coverage area. Optionally, the network device 110 may be a base transceiver station (BTS) in a GSM system or CDMA system, a NodeB (NB) in a WCDMA system, or an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a network bridge, a router, a network side device in a 5G network, a network device in a future evolved public land mobile network (PLMN), or the like.

The communications system 100 further includes at least one terminal device 120 located within coverage of the network device 110. The "terminal" used herein includes but is not limited to being connected by using a wired circuit, for example, being connected by using a public switched telephone network (PSTN), a digital subscriber line (DSL), a digital cable, or a direct cable, and/or by using another data connection/network, and/or by using a wireless interface, for example, a digital television network, a satellite network, and an AM-FM broadcast transmitter of a DVB-H network for a cellular network and a wireless local area network (WLAN); and/or by using an apparatus of another terminal that is configured to receive/send a communication signal; and/or by using an Internet of Things (IoT) device. The terminal configured to perform communication by using a wireless interface may be referred to as a "wireless communications terminal", a "wireless terminal", or a "mobile terminal". Examples of the mobile terminal include but are not limited to a satellite or cellular telephone, a personal communications system (PCS) terminal that may combine a cellular radio telephone and capabilities of data processing, fax, and data communication, a PDA that may include a radio telephone, a pager, Internet/Intranet access, Web browser, a logbook, a calendar, and/or a Global Positioning System (GPS) receiver, and a conventional laptop and/or palmtop receiver or another electronic apparatus including a radio telephone transceiver. The terminal may refer to an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN, or the like.

Optionally, the terminals 120 may perform device to device (D2D) communication with each other.

Optionally, the 5G system or 5G network may also be referred to as a new radio (NR) system or an NR network.

FIG. 1 shows one network device and two terminals as an example. Optionally, the communications system 100 may include a plurality of network devices and another quantity of terminal devices may be included within coverage of each network device. This is not limited in this embodiment of this application.

Optionally, the communications system 100 may further include other network entities such as a network controller and a mobility management entity. This is not limited in this embodiment of this application.

It should be understood that a device having a communication function in a network/system in this embodiment of this application may be referred to as a communications device. The communications system 100 shown in FIG. 1 is used as an example. The communications system may include the network device 110 and the terminal 120 that have a communication function. The network device 110 and the terminal 120 may be the specific devices described above. Details are not described herein again. The communication device may further include other devices in the communications system 100, for example, other network entities such as a network controller and a mobile management entity. This is not limited in this embodiment of this application.

It should be understood that terms "system" and "network" in this specification are usually interchangeably used in this specification. The term "and/or" in this specification is only an association relationship for describing the associated objects, and represents that three relationships may exist. For example, A and/or B may represent the following three cases: Only A exists, both A and B exist, and only B exists. In addition, the character "/" in this specification generally indicates an "or" relationship between the associated objects.

The technical solutions of the embodiments of this application are mainly applied to a 5G mobile communications system. Certainly, the technical solutions of the embodiments of this application are not limited to the 5G mobile communications system, and may also be applied to a mobile communications system of another type. For ease of understanding of the technical solutions of the embodiments of this application, the following describes related technologies involved in the embodiments of this application. It should be noted that the following related technologies also fall within the protection scope of the embodiments of this application.

Data of URLLC needs to be ensured by redundant transmission. Therefore, a 3GPP network needs to establish a plurality of sessions. It should be noted that the meaning of "a plurality of" in the embodiments of this application includes two or more than two, and in a typical implementation, it is two. In addition, the meaning of "session" includes but is not limited to a protocol data unit (PDU) session.

Figure 2A:
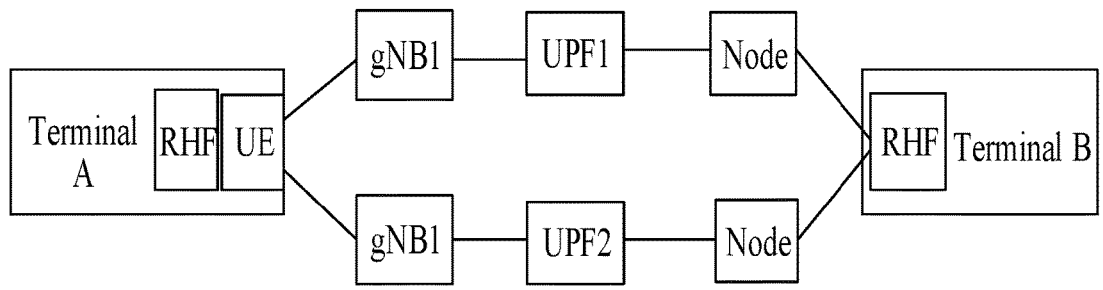
FIG. 2A is a first schematic diagram of redundant transmission according to an embodiment of this application.
Figure 2B:
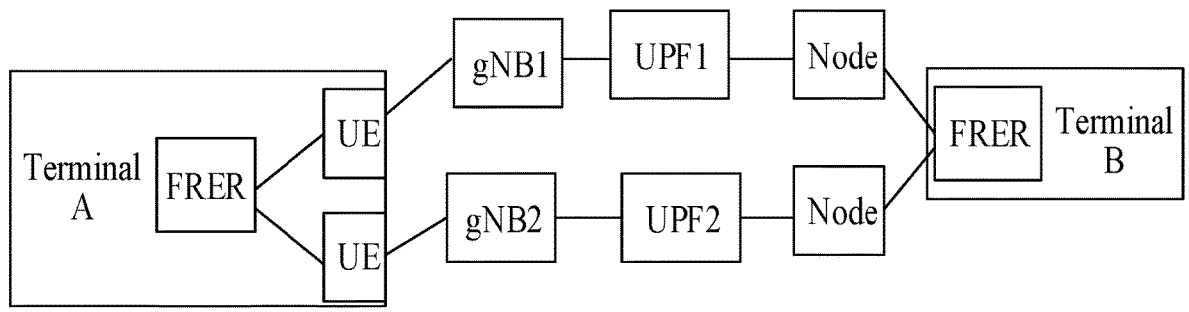
FIG. 2B is a second schematic diagram of redundant transmission according to an embodiment of this application.
Figure 3:
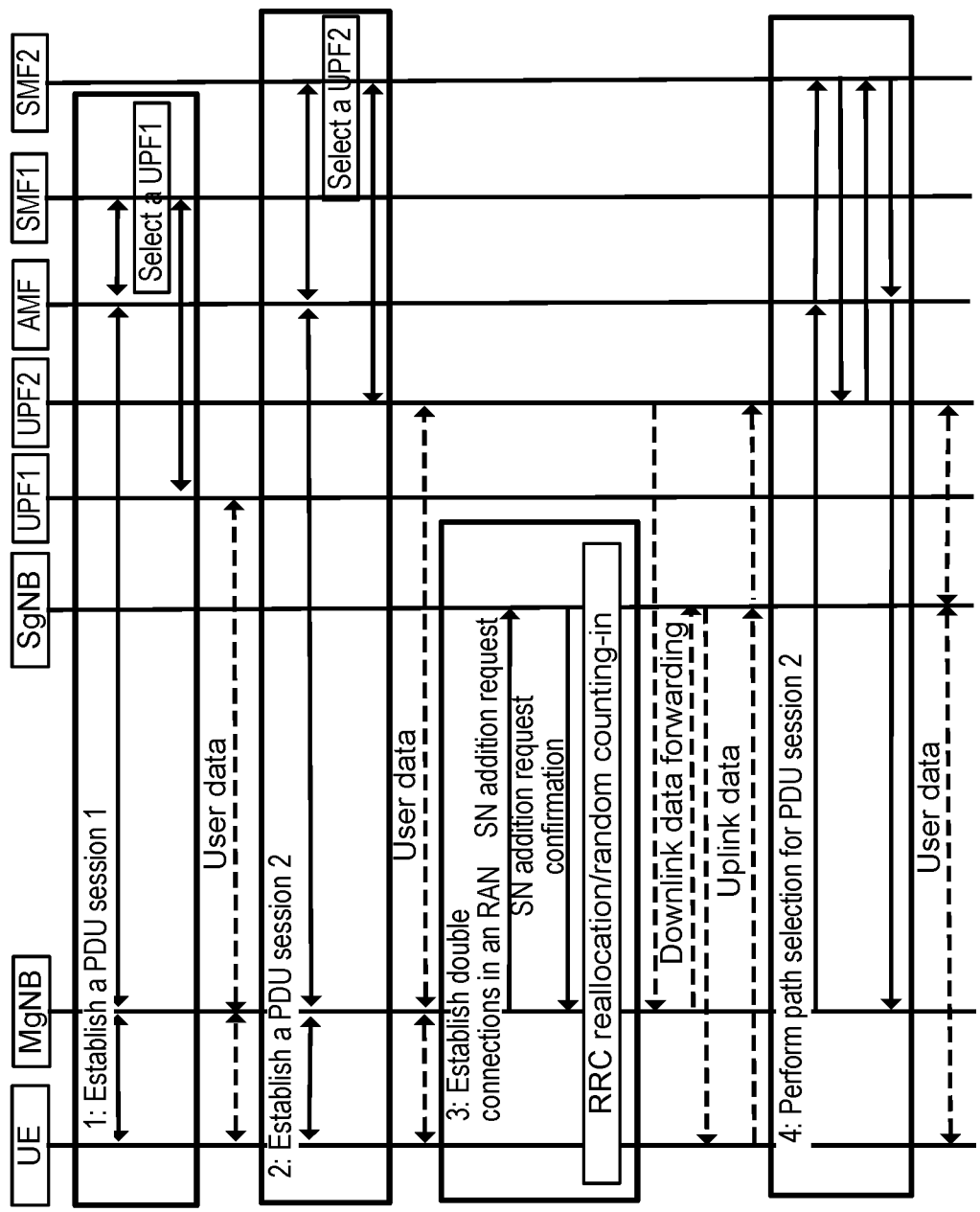
FIG. 3 is a flowchart of establishing two PDU sessions on one UE according to an embodiment of this application.
Figure 4:
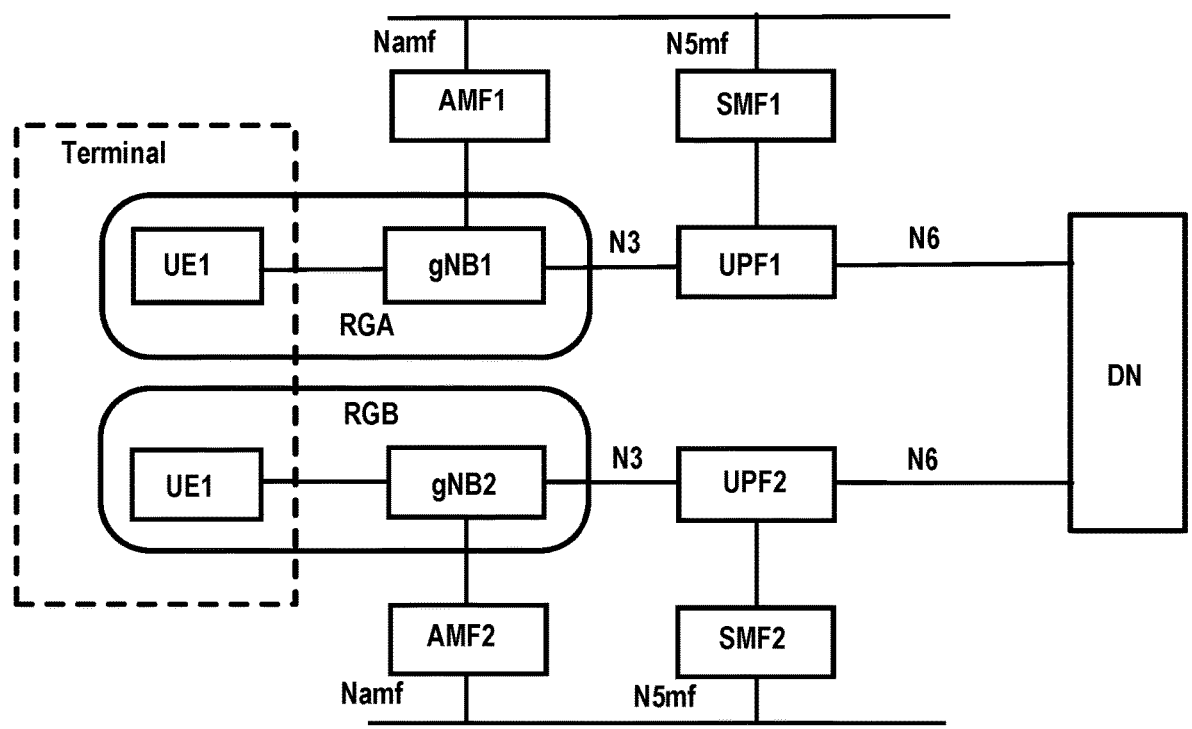
FIG. 4 is a schematic diagram of two UEs accessing different base stations or cells according to an embodiment of this application.

For example, referring to FIG. 2A, redundant transmission means that one user module (UE for short) transmits a same piece of application data by using two PDU sessions. It should be noted that a terminal B in FIG. 2A may be an application server or a mobile device. Referring to FIG. 2B, redundant transmission means that two UEs transmit a same piece of application data by using two PDU sessions, and one PDU session is established on each UE. It can be seen that the redundant transmission is implemented by transmitting a same piece of application data by using a plurality of sessions, and the plurality of sessions correspond to same UE or different UEs. Referring to FIG. 3, a flowchart in which two PDU sessions are established on one UE includes the following process: 1. Establish a PDU session 1. 2. Establish a PDU session 2. 3. Establish double connections in a radio access network (RAN). 4. Perform path selection for the PDU session 2. For a case in which one PDU session (there are two PDU sessions in total) is established on each of two UEs, referring to FIG. 4, the two UEs access different base station or cells (for example, a gNB1 and a gNB2 in FIG. 4) according to a reliability group (RG) of base station broadcasting, and the UEs may alternatively access different base stations or cells by using parameters such as single network slice selection assistance information (S-NSSAI) and a frequency point priority.

Figure 5A:
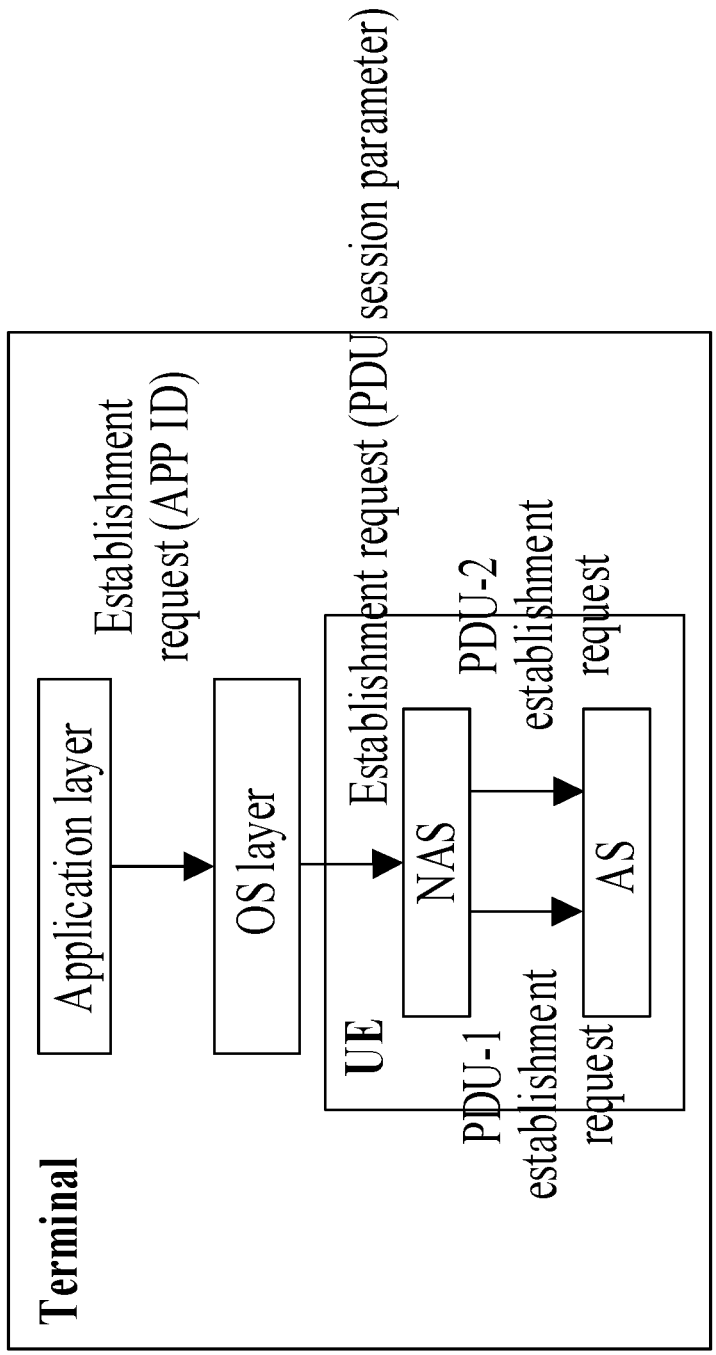
FIG. 5A is a schematic diagram of PDU session establishment when there is one UE according to an embodiment of this application.

FIG. 5A is a schematic diagram of PDU session establishment when there is one UE. A terminal from top to bottom includes: an application layer, an operating system (OS) layer, and UE (namely, a user module). Further, the UE includes a non-access stratum (NAS) layer and an access stratum (AS) layer. The application layer initiates an establishment request to the OS layer, the establishment request carrying an application identifier (APP ID). The OS layer initiates an establishment request to the NAS layer of the UE, the establishment request carrying attribute parameters of a PDU session. The NAS layer of the UE initiates, to the AS layer, two PDU session establishment requests: a PDU-1 session establishment request and a PDU-2 session establishment request. Then, the AS layer of the UE establishes a PDU-1 session and a PDU-2 session, and a same piece of application data is transmitted by using the two PDU sessions.

Figure 5B:
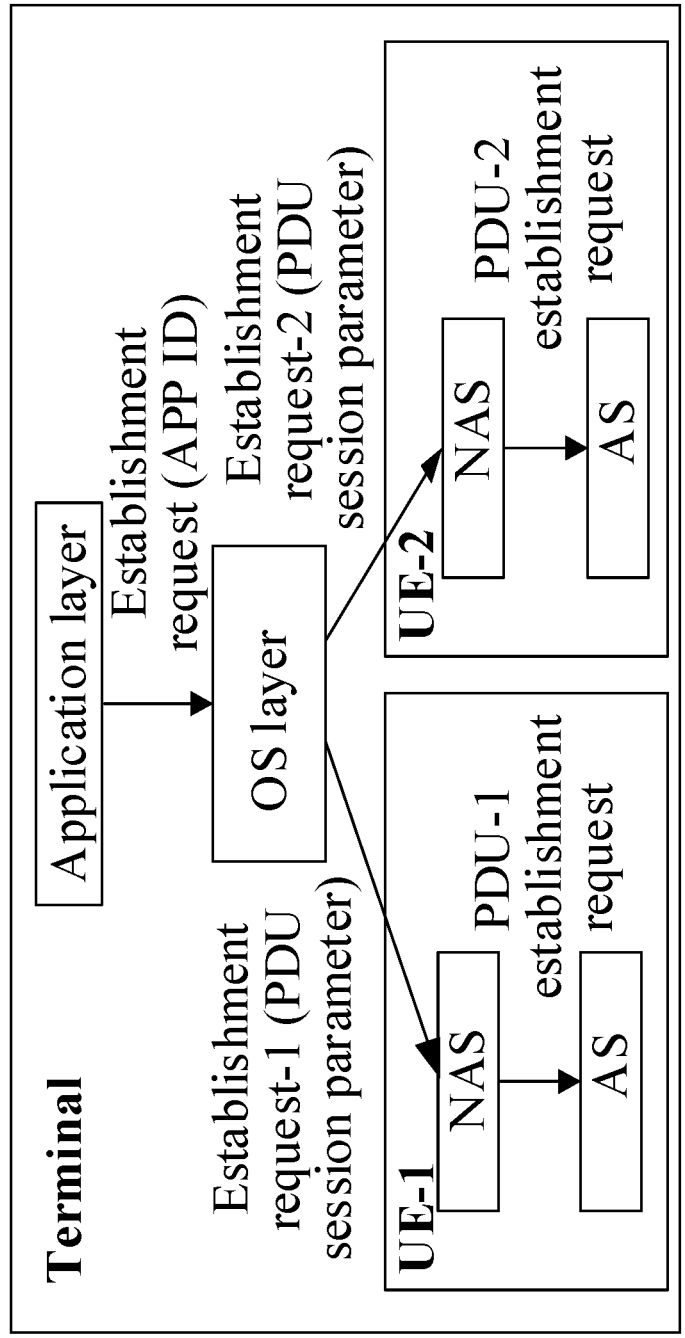
FIG. 5B is a first schematic diagram of PDU session establishment when there are two UEs according to an embodiment of this application.

FIG. 5B is a first schematic diagram of PDU session establishment when there are two UEs. In FIG. 5B, an application layer initiates one establishment request, and an OS layer initiates two establishment requests. Specifically, a terminal from top to bottom includes: the application layer, the OS layer, UE-1, and UE-2. Further, the UE-1 includes a NAS layer and an AS layer, and the UE-2 includes a NAS layer and an AS layer. The application layer initiates an establishment request to the OS layer, the establishment request carrying an APP ID. The OS layer initiates an establishment request-1 to the NAS layer of the UE-1, and initiates an establishment request-2 to the NAS layer of the UE-2, the establishment request-1 and the establishment request-2 carrying same attribute parameters of PDU sessions. The NAS layer of the UE-1 initiates a PDU-1 session establishment request to the AS layer of the UE-1, and the NAS layer of the UE-2 initiates a PDU-2 session establishment request to the AS layer of the UE-2. Then the AS layer of the UE-1 establishes a PDU-1 session, the AS layer of the UE-2 establishes a PDU-2 session, and a same piece of application data is transmitted by using the two PDU sessions.

Figure 5C:
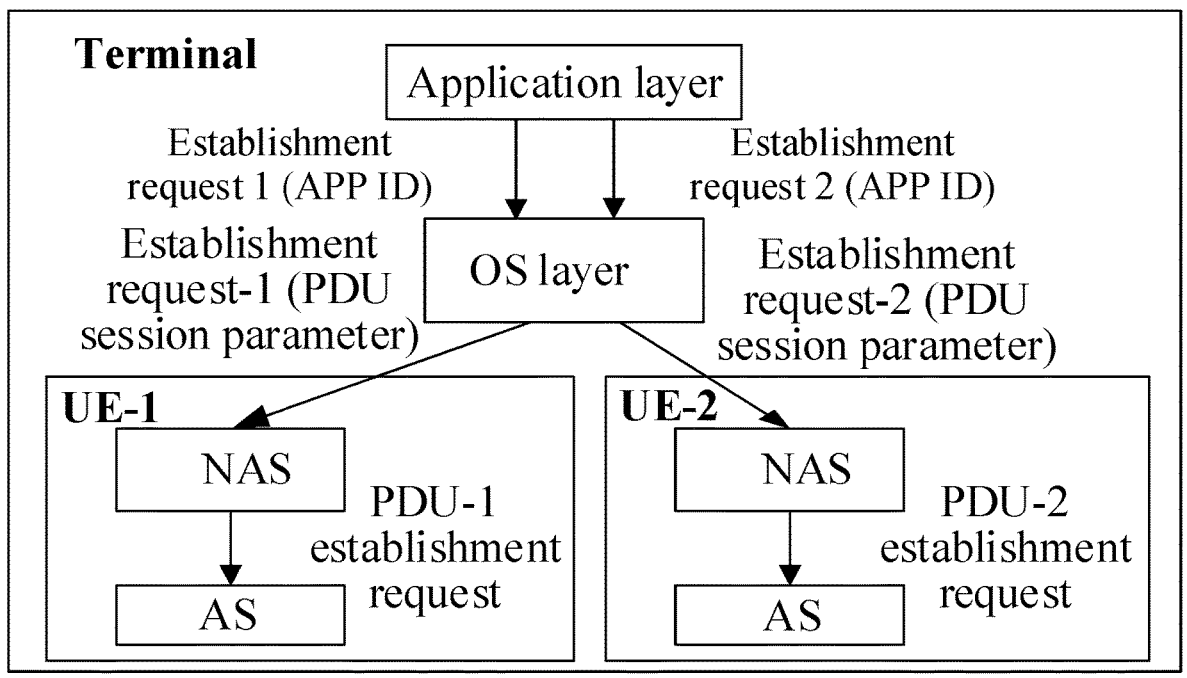
FIG. 5C is a second schematic diagram of PDU session establishment when there are two UEs according to an embodiment of this application.

FIG. 5C is a second schematic diagram of PDU session establishment when there are two UEs. In FIG. 5C, an application layer initiates two establishment requests, and an OS layer initiates two establishment requests. Specifically, a terminal from top to bottom includes: the application layer, the OS layer, UE-1, and UE-2. Further, the UE-1 includes a NAS layer and an AS layer, and the UE-2 includes a NAS layer and an AS layer. The application layer initiates an establishment request 1 and an establishment request 2 to the OS layer, the establishment request 1 and the establishment request 2 carrying a same APP ID. The OS layer initiates an establishment request-1 to the NAS layer of the UE-1, and initiates an establishment request-2 to the NAS layer of the UE-2, the establishment request-1 and the establishment request-2 carrying same attribute parameters of PDU sessions. The NAS layer of the UE-1 initiates a PDU-1 session establishment request to the AS layer of the UE-1, and the NAS layer of the UE-2 initiates a PDU-2 session establishment request to the AS layer of the UE-2. Then, the AS layer of the UE-1 establishes a PDU-1 session, the AS layer of the UE-2 establishes a PDU-2 session, and a same piece of application data is transmitted by using the two PDU sessions.

In addition, binding between the application data and the PDU session is performed by using a UE policy. One UE policy may have a plurality of rules, and content of each rule is shown in the following Table 1 to Table 3.

TABLE 1

UE ROUTE SELECTION POLICY

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the traffic descriptors for the URSP ride. | | | |
| Application descriptors | It consists of OSId and OSAppId(s). (NOTE 2) | Optional | Yes | UE context |
| IP descriptors | IP 3 tuple(s) (destination IP address or IPv6 network prefix, destination port number, protocol ID of the protocol above IP). | Optional | Yes | UE context |
| Non-IP descriptors | Descriptor(s) for non-IP traffic | Optional | Yes | UE context |
| DNN | This is the DNN information provided by the application. | Optional | Yes | UE context |
| Connection Capabilities | This is the information provided by a UE application when it requests a network connection with certain capabilities. | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS.

TABLE 2

ROUTE SELECTION DESCRIPTOR

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP) when the UE establishes a PDU Session for the matching application. | Optional | Yes | UE context |

(NOTE 1):
Every Route Selection Descriptor in the list shall have a different precedence value.
(NOTE 2):

TABLE 2-continued

ROUTE SELECTION DESCRIPTOR

| Information name | Description | Category | PCF permitted to modify in URSP | Scope |
|---|---|---|---|---|

At least one of the route selection component shall be present.
(NOTE 3):
When the Subscription Information contains only one S-NSSAI in UDR, the PCF needs not provision the UE with S-NSSAI in the Network Slice Selection information.
(NOTE 4):
If this indication is present in a Route Selection Descriptor, no other components shall be included in the Route Selection Descriptor.

TABLE 3

ROUTE SELECTION DESCRIPTOR

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP) when the UE establishes a PDU Session for the matching application. | Optional | Yes | UE context |

(NOTE 1):
Every Route Selection Descriptor in the list shall have a different precedence value.
(NOTE 2):
At least one of the route selection component shall be present.
(NOTE 3):
When the Subscription Information contains only one S-NSSAI in UDR, the PCF needs not provision the UE with S-NSSAI in the Network Slice Selection information.
(NOTE 4):
If this indication is present in a Route Selection Descriptor, no other components shall be included in the Route Selection Descriptor.

It can be seen from the foregoing Table 1 to Table 3 that the rule is divided into two parts, where a first part is traffic descriptors, and a second part is route selection descriptors (RSDs). The traffic descriptors are used for describing features of a particular application data flow, and there may be one or more RSDs corresponding to the particular application data flow. A terminal initiates establishment of a PDU session according to the RSD, where a PDU session establishment request carries attribute parameters included in the RSD, so that a network side establishes the PDU session having particular features.

The traffic descriptors are mainly used in interaction between an application layer and an OS layer of the terminal. After identifying particular application data, the OS layer sends a PDU session establishment request message to UE according to a corresponding RSD, or binds the application data to an existing PDU session meeting conditions for transmission. Therefore, the RSD is mainly used in interaction between the OS layer and the UE.

Based on the foregoing binding mechanism between the application data and the PDU session, one parameter (namely, first information in the embodiments of this application) is added to the RSD in the embodiments of this application. The parameter indicates whether to perform redundant transmission (that is, whether to perform a first action in the embodiments of this application). In addition, the parameter may indicate PDU sessions of how many UEs (for example, one UE or a plurality of UEs) are used in transmission, and a quantity of sessions of redundant transmission (for example, two or three sessions).

Figure 6:
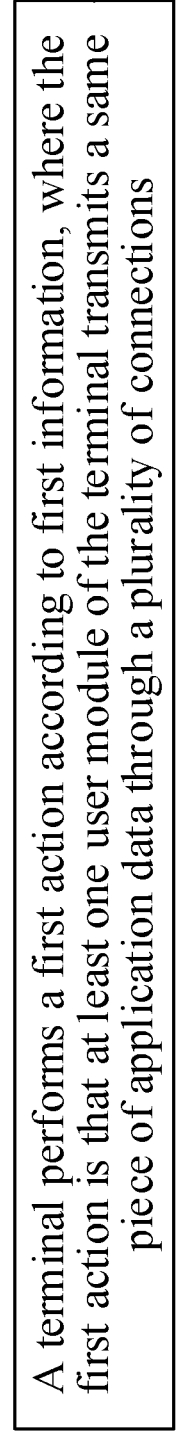
FIG. 6 is a first schematic flowchart of a data transmission method according to an embodiment of this application.

FIG. 6 is a first schematic flowchart of a data transmission method according to an embodiment of this application. As shown in FIG. 6, the data transmission method includes the following steps:

Step 601. A terminal performs a first action according to first information, where the first action is that at least one user module of the terminal transmits a same piece of application data through a plurality of connections.

In this embodiment of this application, the terminal may be any device that can communicate with a network, such as a mobile phone, a tablet computer, a palm computer, an in-vehicle terminal, or a wearable device.

In this embodiment of this application, the connections may be, but are not limited to, being implemented by using a session. Further, the connections may be PDU sessions.

In this embodiment of this application, the terminal from top to bottom includes: an application layer, an OS layer, user modules (namely, UEs in FIG. 5A to FIG. 5C). It should be noted that the terminal may include one user module, or may include a plurality of user modules (two user modules for a typical case). Further, the user module includes a NAS layer and an AS layer. In a case in which the terminal includes a plurality of user modules, different user modules in the terminal have different NAS layers and/or AS layers.

In this embodiment of this application, the terminal receives the first information sent by a network side, and performs a first action according to the first information, where the first action is that at least one user module of the terminal transmits a same piece of application data through a plurality of connections. In an implementation, the first information is sent to the terminal by a network element of a core network on the network side by using an NAS message.

In this embodiment of this application, the first information includes at least one type of the following information: indication information for whether to perform the first action, a quantity of connections required for performing the first action, and a quantity of user modules required for performing the first action.

In this embodiment of this application, the same piece of application data is data in the terminal that corresponds to a same APP ID and/or data network name (DNN) and/or network slice and/or application server IP address identifier.

In this embodiment of this application, the first action may also be referred to as redundant transmission. The redundant transmission is to perform transmission on a same piece of application data by using a plurality of sessions, and the plurality of sessions correspond to a same user module or different user modules.

For example, referring to FIG. 2A, redundant transmission means that one UE transmits a same piece of application data by using two PDU sessions. Referring to FIG. 2B, redundant transmission means that two UEs transmit a same piece of application data by using two PDU sessions, and one PDU session is established on each UE.

For another example, referring to FIG. 5A, one UE transmits a same piece of application data by using two PDU sessions. Specifically, an application layer initiates an establishment request to an OS layer, the establishment request carrying an APP ID. The OS layer initiates an establishment request to a NAS layer of the UE, the establishment request carrying attribute parameters of the PDU sessions. The NAS layer of the UE initiates, to an AS layer, two PDU session establishment requests: a PDU-1 session establishment request and a PDU-2 session establishment request. Then, the AS layer of the UE establishes a PDU-1 session and a PDU-2 session, and a same piece of application data is transmitted by using the two PDU sessions.

For another example, referring to FIG. 5B, two UEs transmit a same piece of application data by using two PDU sessions, one PDU session is established on each UE, an application layer initiates one establishment request, and an OS layer initiates two establishment requests. Specifically, the application layer initiates an establishment request to the OS layer, the establishment request carrying an APP ID. The OS layer initiates an establishment request-1 to a NAS layer of UE-1, and initiates an establishment request-2 to a NAS layer of UE-2, the establishment request-1 and the establishment request-2 carrying same attribute parameters of PDU sessions. The NAS layer of the UE-1 initiates a PDU-1 session establishment request to an AS layer of the UE-1, and the NAS layer of the UE-2 initiates a PDU-2 session establishment request to an AS layer of the UE-2. Then, the AS layer of the UE-1 establishes a PDU-1 session, the AS layer of the UE-2 establishes a PDU-2 session, and a same piece of application data is transmitted by using the two PDU sessions.

For another example, referring to FIG. 5C, two UEs transmit a same piece of application data by using two PDU sessions, one PDU session is established on each UE, an application layer initiates two establishment requests, and an OS layer initiates two establishment requests. Specifically, the application layer initiates an establishment request 1 and an establishment request 2 to the OS layer, the establishment request 1 and the establishment request 2 carrying a same APP ID. The OS layer initiates an establishment request-1 to a NAS layer of UE-1, and initiates an establishment request-2 to a NAS layer of UE-2, the establishment request-1 and the establishment request-2 carrying same attribute parameters of PDU sessions. The NAS layer of the UE-1 initiates a PDU-1 session establishment request to an AS layer of the UE-1, and the NAS layer of the UE-2 initiates a PDU-2 session establishment request to an AS layer of the UE-2. Then the AS layer of the UE-1 establishes a PDU-1 session, the AS layer of the UE-2 establishes a PDU-2 session, and a same piece of application data is transmitted by using the two PDU sessions.

In the embodiments of this application, when new application data generates from an application layer of upper layers, the terminal performs session binding according to rules of a UE policy. Specific performing judgment is described as follows:

For each newly-generated application data from an upper layer, the terminal evaluates a URSP rule according to a sequence of rule priorities, and determines whether the application data matches a traffic descriptor of any URSP rule. When an APP ID is found, and description information of a DNN or an application matches a traffic descriptor in a URSP rule, the terminal should select an RSD in the URSP rule according to a sequence of RSD priorities. Further, when there is a matching PDU session in current PDU sessions, the terminal associates the application data with the current PDU sessions, that is, binds the application data with the current PDU sessions. If none of the current PDU sessions match, the terminal attempts to use a value specified by the selected RSD to establish a new PDU session. Based on the foregoing binding mechanism between the application data and the PDU session, one parameter (namely, the first information in the embodiments of this application) is added in the embodiments of this application. The parameter indicates whether to perform redundant transmission (that is, whether to perform the first action in the embodiments of this application). In addition, the parameter may indicate transmission of a PDU session using how many UEs (for example, one UE or a plurality of UEs), and a quantity of sessions of redundant transmission (for example, two or three sessions).

In an implementation, the terminal reports whether the terminal has a capability of performing the first action to the network side. Herein, an objective of the terminal to report the capability is to cause the network side to determine, according to the capability, whether to deliver the first information and/or content of the first information. Further, the terminal reports, by using an NAS message whether the terminal has a capability of performing the first action to the network side.

Herein, the capability of performing the first action refers to: a capability of transmitting a same piece of application data by using a plurality of connections.

In an implementation, the terminal receives whether the terminal has a capability of performing the first action that is delivered by the network side. Herein, an objective of the network side to deliver the capability is to cause the terminal to determine whether to perform and/or how to perform the first action.

Herein, the capability of performing the first action refers to: a capability of transmitting a same piece of application data by using a plurality of connections.

In the foregoing solutions, the first action is applied to at least one of the following scenarios: performing transmission through different connections by using different core network user plane devices and different base stations; performing transmission through different connections by using different core network user plane devices and a same base station; performing transmission through different connections by using a same core network user plane device and a same base station; and performing transmission through different connections by using a same core network user plane device and different base stations.

In this embodiment of this application, the plurality of connections for transmitting the same piece of application data correspond to different DNNs and/or S-NSSAI and/or APP IDs. In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs.

In this embodiment of this application, the plurality of connections for transmitting the same piece of application data correspond to different DNNs and/or S-NSSAI and/or APP IDs and/or VLAN IDs and/or MAC addresses and/or IP addresses. In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs and/or VLAN IDs and/or MAC addresses and/or IP addresses. Herein, the MAC addresses and/or IP addresses may be addresses of application servers.

Herein, the application layer duplicates a same piece of data to obtain a plurality of pieces of same data, and the plurality of pieces of same data are respectively sent by using a plurality of application connections. The application connections include an HTTP connection and/or a TCP connection.

For example, redundant transmission is performed on a same piece of application data through two connections, and two different DNNs are allocated to a same application and are added to a traffic descriptor of a URSP rule to be sent to the terminal. The two connections are respectively denoted as a traffic flow-1 and a traffic flow-2. In this case, the traffic flow-1 corresponds to a DNN1, and the traffic flow-2 corresponds to a DNN2. By using the DNN1 and the DNN2, it can be identified that the traffic flow-1 corresponds a URSP rule-1, and the traffic flow-2 corresponds a URSP rule-2. In addition, the two DNNs may correspond to a same data network (DN). The DN may refer to a network providing services, for example, operator services, Internet access, or 3rd party services.

For example, an S-NSSAI parameter (as shown in the following Table 4) is added to the traffic descriptor of the URSP rule. In this way, the two traffic flows correspond to different S-NSSAI, and URSP rules to which the two traffic flows correspond may be accurately identified according to the different S-NSSAI.

TABLE 4

UE ROUTE SELECTION POLICY

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Rule Precedence | Determines the order the URSP rule is enforced in the UE. |
| Traffic descriptor | This part defines the traffic descriptors for the URSP rule. | | | |
| Application descriptors | It consists of OSId and OSAppId(s). (NOTE 2) | Optional | Yes | UE context |
| IP descriptors | IP 3 tuple(s) (destination IP address or IPv6 network prefix, destination port number, protocol ID of the protocol above IP). | Optional | Yes | UE context |

TABLE 4-continued

UE ROUTE SELECTION POLICY

| Information name | Description | Category | PCF permitted to modify in a UE context | Scope |
|---|---|---|---|---|
| Non-IP descriptors | Descriptor(s) for non-IP traffic | Optional | Yes | UE context |
| DNN | This is the DNN information provided by the application. | Optional | Yes | UE context |
| Connection Capabilities | This is the information provided by a UE application when it requests a network connection with certain capabilities. | Optional | Yes | UE context |
| S-NSSAI | | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS.

For example, two or more APP IDs are allocated to a same application. In this way, when redundant transmission data occurs, different traffic flows may be corresponded to different APP IDs.

In this embodiment of this application, first indication information is configured in second information, where the first indication information is used for indicating at least one of the following: a type of a service requiring redundant transmission, indication information requiring redundant transmission, and a path number of redundant transmission. The second information is included in a traffic descriptor and/or RSD in a URSP rule.

For example, a parameter is added to the traffic descriptor, to be used for indicating a URLCC service (namely, a service requiring redundant transmission). Alternatively, a new value is added to a current connection capability to be used for indicating redundant transmission or indicate being which path (redundant transmission path).

In this embodiment of this application, when initiating establishment or modification of a session, the terminal sends a first identifier to a network, where the first identifier is used for indicating at least one of the following: whether the session is a session of redundant transmission, and the session is which one of a plurality of sessions of redundant transmission.

For example, the first identifier is added to the RSD. As shown in FIG. 3, the first identifier is used for indicating whether being a PDU session of redundant transmission and/or which one of a plurality of PDU sessions of redundant transmission. Herein the PDU sessions of the redundant transmission means that there are a plurality of PDU sessions transmitting redundant data. The first identifier is used by the terminal, during session establishment/modification, to find a corresponding first identifier in the RSD according to the URSP rule and report the first identifier to the network. Herein, the first identifier may be the path number of redundant transmission.

In this embodiment of this application, one or more RSDs under one traffic descriptor include one or more second parameters, where the second parameter is an attribute parameter of a session. Herein, the attribute parameter of the session (for example, a PDU session) includes S-NSSAI and/or a DNN. The second parameter is included in one RSD or the second parameter is included in a plurality of RSDs. Specifically, entire content of the second parameter is included in one RSD, or one part of content of the second parameter is included in one RSD (for example, a first RSD), and the other part of content is included in another RSD (for example, a second RSD).

Herein, the second parameter is used for transmitting data flows under one traffic descriptor by using one or more sessions corresponding to the second parameter. Further, the one or more sessions corresponding to the second parameter refer to one or more sessions corresponding to a combination of the second parameter and a parameter in another RSD (an RSD other than the RSD at which the second parameter is located). Referring to FIG. 5, one RSD includes two sets of parameters for S-NSSAI, where a first set of parameters includes: S-NSSAI-11, S-NSSAI-12, and S-NSSAI-13, and a second set of parameters includes: S-NSSAI-21, S-NSSAI-22, and S-NSSAI-23; and one RSD includes two sets of parameters for DNNs, where a first set of parameters includes: a DNN-11, a DNN-12, and a DNN-13, and a second set of parameters includes: a DNN-21, a DNN-22, and a DNN-23.

TABLE 5

| | | ROUTE SELECTION DESCRIPTOR | | |
|---|---|---|---|---|
| Information name | Description | Category | PCF permitted to modify in URSP | Scope |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either a single value or a list of values of S-NSSAI(s). First group: S-NSSAI-11, S-NSSAI-12, and S-NSSAI-13 Second group: S-NSSAI-21, S-NSSAI-22, and S-NSSAI-23 | Optional (NOTE 3) | Yes | UE context |
| DNN Selection | Either a single value or a list of values of DNN(s). First group: DNN-11, DNN-12, and DNN-13 Second group: DNN-21, DNN-22, and DNN-23 | Optional | Yes | UE context |
| PDU Session Type Selection | One single value of PDU Session Type | Optional | Yes | UE context |
| Non-seamless Offload indication | Indicates if the traffic of the matching application is to be offloaded to non-3GPP access outside of a PDU Session. | Optional (NOTE 4) | Non-seamless Offload indication | Indicates if the traffic of the matching application is to be offloaded to non-3GPP access outside of a PDU Session. |
| Access Type preference | Indicates the preferred Access Type (3GPP or non-3GPP) when the UE establishes a PDU Session for the matching application. | Optional | Yes | UE context |

(NOTE 1):
Every Route Selection Descriptor in the list shall have a different precedence value.
(NOTE 2):
At least one of the route selection component shall be present.
(NOTE 3):
When the Subscription Information contains only one S-NSSAI in UDR, the PCF needs not provision the UE with S-NSSAI in the Network Slice Selection information.
(NOTE 4):
If this indication is present in a Route Selection Descriptor, no other components shall be included in the Route Selection Descriptor.

In this embodiment of this application, the terminal performs the first action according to third information, where the third information is used for indicating RSDs or second parameters in the RSDs that respectively correspond to each of the one or more sessions. Further, the third information is sent to the terminal by the network side. Herein, the terminal respectively establishes the plurality of sessions according to the RSDs or the second parameters in the RSDs that respectively correspond to each of the sessions.

In the foregoing solution in this embodiment of this application, at least one of the first information, the second information, the third information, and the URSP rule is sent to an AMF by a PCF network element in a manner of a container, and after obtaining the container, the AMF transparently transmits content in the container to the terminal by using an NAS message.

Figure 7:
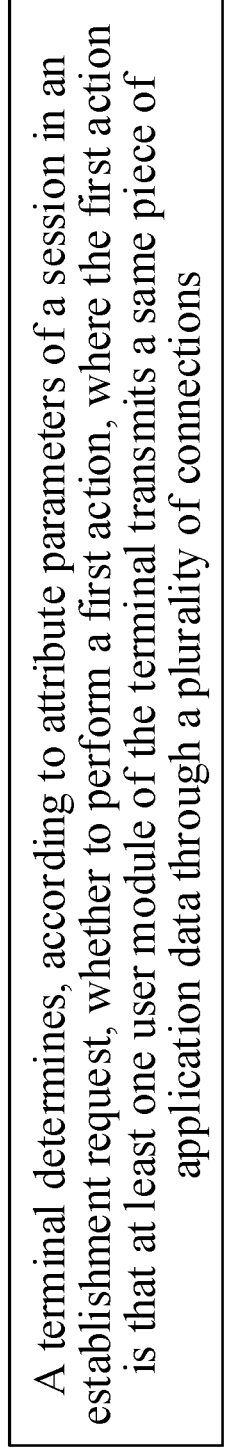
FIG. 7 is a second schematic flowchart of a data transmission method according to an embodiment of this application.

FIG. 7 is a second schematic flowchart of a data transmission method according to an embodiment of this application. As shown in FIG. 7, the data transmission method includes the following steps:

Step 701. A terminal determines, according to attribute parameters of a session in an establishment request, whether to perform a first action, where the first action is that at least one user module of the terminal transmits a same piece of application data through a plurality of connections.

In this embodiment of this application, the terminal may be any device that can communicate with a network, such as a mobile phone, a tablet computer, a palm computer, an in-vehicle terminal, or a wearable device.

In this embodiment of this application, the terminal from top to bottom includes: an application layer, an OS layer, user modules (namely, UEs in FIG. 5A to FIG. 5C). It should be noted that the terminal may include one user module, or may include a plurality of user modules (two user modules for a typical case). Further, the user module includes a NAS layer and an AS layer. In a case in which the terminal includes a plurality of user modules, different user modules in the terminal have different NAS layers and/or AS layers.

In this embodiment of this application, the same piece of application data is data in the terminal that corresponds to a same APP ID and/or DNN and/or network slice and/or application server IP address identifier.

In this embodiment of this application, the terminal determines, according to attribute parameters of a session in an establishment request, whether to perform a first action, where the first action is that at least one user module of the terminal transmits a same piece of application data through a plurality of connections. Further, the terminal further determines a quantity of connections required for performing the first action, and a quantity of user modules required for performing the first action.

In an implementation, if the application layer and/or OS layer of the terminal requests to initiate a same connection for a plurality of times or requests to initiate a connection same as an existing connection in the user module for a same piece of application data, the terminal performs the first action, where the same connection refers to a connection having same or partially same attribute parameters.

For example, if the application layer and/or OS layer of the terminal initiates two same sessions for a same piece of application data, then one user module may transmit the same piece of application data by using the two sessions, or two user modules may respectively transmit the same piece of application data by using two user modules.

For another example, if the application layer and/or OS layer of the terminal initiates one session that is the same as an existing session in a user module 1 for a same piece of application data, then the user module 1 may transmit the same piece of application data by using two sessions, or the user module1 and another user module 2 may respectively transmit the same piece of application data by using two sessions.

Further, the attribute parameters include at least one of the following: a session type, S-NSSAI, a DNN, a service and continuity mode (SCC mode), a target IP address, and a target MAC address.

In this embodiment of this application, the first action may also be referred to as redundant transmission. The redundant transmission is to perform transmission on a same piece of application data by using a plurality of sessions, and the plurality of sessions correspond to a same user module or different user modules.

In the embodiments of this application, when new application data generates from an application layer of upper layers, the terminal performs session binding according to rules of a UE policy. For specific performing judgment descriptions, references may be made to the description in the embodiment shown in FIG. 6. Details are not described herein again.

In an implementation, the terminal reports whether the terminal has a capability of performing the first action to the network side. Herein, an objective of the terminal to report the capability is to cause the network side to determine, according to the capability, whether to deliver the first information and/or content of the first information. Further, the terminal reports, by using an NAS message, whether the terminal has a capability of performing the first action to the network side.

Herein, the capability of performing the first action refers to: a capability of transmitting a same piece of application data by using a plurality of connections.

In an implementation, the terminal receives whether the terminal has a capability of performing the first action that is delivered by the network side. Herein, an objective of the network side to deliver the capability is to cause the terminal to determine whether to perform and/or how to perform the first action.

Herein, the capability of performing the first action refers to: a capability of transmitting a same piece of application data by using a plurality of connections.

In the foregoing solutions, the first action is applied to at least one of the following scenarios: performing transmission through different connections by using different core network user plane devices and different base stations; performing transmission through different connections by using different core network user plane devices and a same base station;
performing transmission through different connections by using a same core network user plane device and a same base station; and performing transmission through different connections by using a same core network user plane device and different base stations.

In this embodiment of this application, the plurality of connections for transmitting the same piece of application data correspond to different DNNs and/or S-NSSAI and/or APP IDs.

In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs.

In this embodiment of this application, the application layer duplicates a same piece of data to obtain a plurality of pieces of same data, and the plurality of pieces of same data are respectively sent by using a plurality of application connections. The application connections include an HTTP connection and/or a TCP connection.

For example, redundant transmission is performed on a same piece of application data through two connections, and two different DNNs are allocated to a same application and are added to a traffic descriptor of a URSP rule to be sent to the terminal. The two connections are respectively denoted as a traffic flow-1 and a traffic flow-2. In this case, the traffic flow-1 corresponds to a DNN1, and the traffic flow-2 corresponds to a DNN2. By using the DNN1 and the DNN2, it can be identified that the traffic flow-1 corresponds a URSP rule-1, and the traffic flow-2 corresponds a URSP rule-2. In addition, the two DNNs may correspond to a same DN. The DN may refer to a network providing services, for example, operator services, Internet access, or 3rd party services.

For example, an S-NSSAI parameter (as shown in the following Table 4) is added to the traffic descriptor of the URSP rule. In this way, the two traffic flows correspond to different S-NSSAI, and URSP rules to which the two traffic flows correspond may be accurately identified according to the different S-NSSAI.

For example, two or more APP IDs are allocated to a same application. In this way, when redundant transmission data occurs, different traffic flows may be corresponded to different APP In this embodiment of this application, first indication information is configured in second information, where the first indication information is used for indicating at least one of the following: a type of a service requiring redundant transmission, indication information requiring redundant transmission, and a path number of redundant transmission. The second information is included in a traffic descriptor and/or RSD in a URSP rule.

For example, a parameter is added to the traffic descriptor, to be used for indicating a URLCC service (namely, a service requiring redundant transmission). Alternatively, a new value is added to a current connection capability to be used for indicating redundant transmission or indicate being which path (redundant transmission path).

In this embodiment of this application, when initiating establishment or modification of a session, the terminal sends a first identifier to a network, where the first identifier is used for indicating at least one of the following: whether the session is a session of redundant transmission, and the session is which one of a plurality of sessions of redundant transmission.

For example, the first identifier is added to the RSD. As shown in FIG. 3, the first identifier is used for indicating whether being a PDU session of redundant transmission and/or which one of a plurality of PDU sessions of redundant transmission. Herein the PDU sessions of the redundant transmission means that there are a plurality of PDU sessions transmitting redundant data. The first identifier is used by the terminal, during session establishment/modification, to find a corresponding first identifier in the RSD according to the URSP rule and report the first identifier to the network. Herein, the first identifier may be the path number of redundant transmission.

Figure 8:
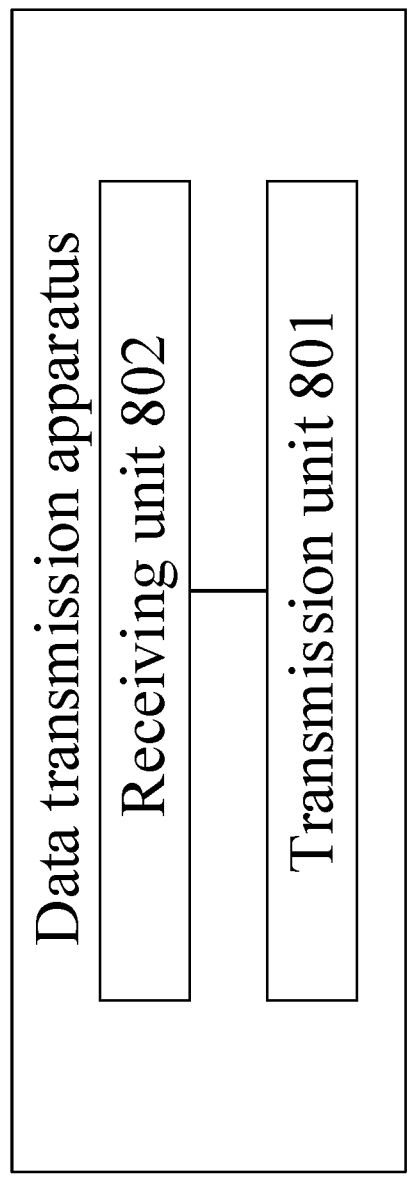
FIG. 8 is a first schematic structural composition diagram of a data transmission apparatus according to an embodiment of this application.

FIG. 8 is a first schematic structural composition diagram of a data transmission apparatus according to an embodiment of this application. As shown in FIG. 8, the data transmission apparatus includes a transmission unit 801, configured to perform a first action according to first information, where the first action is that at least one user module of a terminal transmits a same piece of application data through a plurality of connections.

In an implementation, the same piece of application data is data in the terminal that corresponds to a same APP ID and/or DNN and/or network slice and/or application server IP address identifier.

In an implementation, the apparatus further includes a receiving unit 802, configured to receive the first information sent by a network side, and perform the first action according to the first information.

In an implementation, the first information is sent to the terminal by a network element of a core network on the network side by using an NAS message.

In an implementation, the first information includes at least one type of the following information: indication information for whether to perform the first action, a quantity of connections required for performing the first action, and a quantity of user modules required for performing the first action.

In an implementation, different user modules in the terminal have different NAS layers and/or AS layers.

In an implementation, the apparatus further includes a capability reporting unit (not shown in the figure), configured to report whether the apparatus has a capability of performing the first action to the network side.

In an implementation, the capability reporting unit is configured to report, by using an NAS message, whether the apparatus has a capability of performing the first action to the network side.

In an implementation, the receiving unit 802 is further configured to receive: whether the apparatus has a capability of performing the first action that is delivered by the network side.

In an implementation, the first action is applied to at least one of the following scenarios performing transmission through different connections by using different core network user plane devices and different base stations; performing transmission through different connections by using different core network user plane devices and a same base station;
performing transmission through different connections by using a same core network user plane device and a same base station; and performing transmission through different connections by using a same core network user plane device and different base stations.

In this embodiment of this application, the plurality of connections for transmitting the same piece of application data correspond to different DNNs and/or S-NSSAI and/or APP IDs. In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs.

In this embodiment of this application, the plurality of connections for transmitting the same piece of application data correspond to different DNNs and/or S-NSSAI and/or APP IDs and/or VLAN IDs and/or MAC addresses and/or IP addresses. In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs and/or VLAN IDs and/or MAC addresses and/or IP addresses.

In this embodiment of this application, first indication information is configured in second information, where the first indication information is used for indicating at least one of the following: a type of a service requiring redundant transmission, indication information requiring redundant transmission, and a path number of redundant transmission. The second information is included in a traffic descriptor and/or RSD in a URSP rule.

In this embodiment of this application, one or more RSDs under one traffic descriptor include one or more second parameters, where the second parameter is an attribute parameter of a session.

In this embodiment of this application, the second parameter is included in one RSD or the second parameter is included in a plurality of RSDs.

In this embodiment of this application, the second parameter is used for transmitting data flows under one traffic descriptor by using one or more sessions corresponding to the second parameter. Further, the one or more sessions corresponding to the second parameter refer to one or more sessions corresponding to a combination of the second parameter and a parameter in another RSD.

In this embodiment of this application, the transmission unit 801 is configured to perform the first action according to third information, where the third information is used for indicating RSDs or second parameters in the RSDs that respectively correspond to each of the one or more sessions.

In this embodiment of this application, the third information is sent to the terminal by the network side.

In this embodiment of this application, the transmission unit 801 is further configured to send a first identifier to a network when establishment or modification of a session s initiated, where the first identifier is used for indicating at least one of the following: whether the session is a session of redundant transmission, and the session is which one of a plurality of sessions of redundant transmission.

A person skilled in the art should understand that related descriptions of the foregoing data transmission apparatus in this embodiment of this application may be understood by making references to the related descriptions of the data transmission method in the embodiments of this application.

Figure 9:
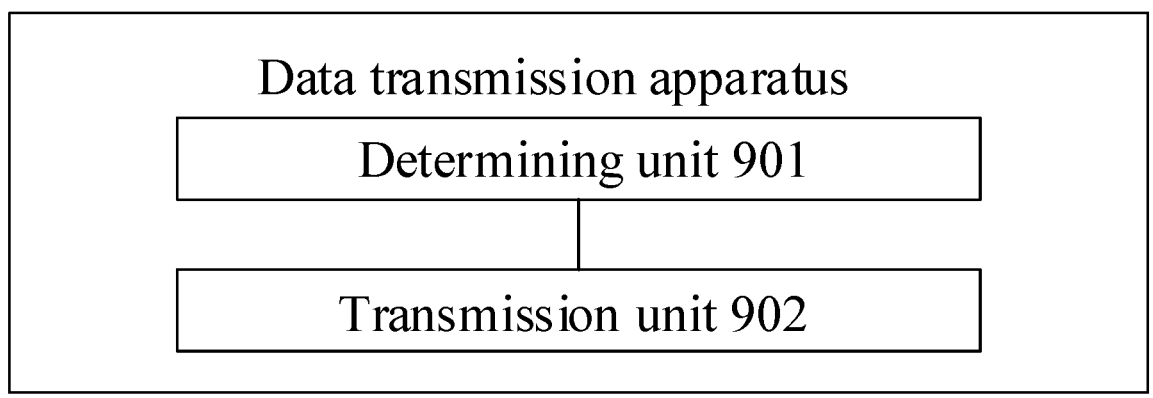
FIG. 9 is a second schematic structural composition diagram of a data transmission apparatus according to an embodiment of this application.

FIG. 9 is a second schematic structural composition diagram of a data transmission apparatus according to an embodiment of this application. As shown in FIG. 9, the data transmission apparatus includes a determining unit 901, configured to determine, according to attribute parameters of a session in an establishment request, whether to perform a first action, where the first action is that at least one user module of the terminal transmits a same piece of application data through a plurality of connections.

In an implementation, the same piece of application data is data in the terminal that corresponds to a same APP ID and/or DNN and/or network slice and/or application server IP address identifier.

In an implementation, the apparatus further includes: a transmission unit 902.

The transmission unit 902 is configured to: if an application layer and/or OS layer of the terminal requests to initiate a same connection for a plurality of times or requests to initiate a connection same as an existing session in the user module for a same piece of application data, the transmission unit 902 performs the first action, where the same connection refers to a connection having same or partially same attribute parameters.

In an implementation, the attribute parameters include at least one of the following: a session type, S-NSSAI, a DNN, an SCC mode, a target IP address, and a target MAC address.

In an implementation, different user modules in the terminal have different NAS layers and/or AS layers.

In an implementation, the apparatus further includes a capability reporting unit (not shown in the figure), configured to report whether the apparatus has a capability of performing the first action to the network side.

In an implementation, the capability reporting unit is configured to report, by using an NAS message, whether the apparatus has a capability of performing the first action to the network side.

In an implementation, the apparatus further includes a receiving unit (not shown in the figure), configured to receive: whether the apparatus has a capability of performing the first action that is delivered by the network side.

In an implementation, the first action is applied to at least one of the following scenarios performing transmission through different connections by using different core network user plane devices and different base stations; performing transmission through different connections by using different core network user plane devices and a same base station;
performing transmission through different connections by using a same core network user plane device and a same base station; and performing transmission through different connections by using a same core network user plane device and different base stations.

In this embodiment of this application, the plurality of connections for transmitting the same piece of application data correspond to different DNNs and/or S-NSSAI and/or APP IDs. In specific implementation, a DNN and/or S-NSSAI and/or an APP ID corresponding to one of the plurality of connections is configured in one of a plurality of traffic descriptors, where the plurality of connections correspond to different DNNs and/or S-NSSAI and/or APP IDs.

In this embodiment of this application, first indication information is configured in second information, where the first indication information is used for indicating at least one of the following: a type of a service requiring redundant transmission, indication information requiring redundant transmission, and a path number of redundant transmission. The second information is included in a traffic descriptor and/or RSD in a URSP rule.

In this embodiment of this application, the apparatus further includes: a transmission unit 902, configured to send a first identifier to a network when establishment or modification of a session is initiated, where the first identifier is used for indicating at least one of the following: whether the session is a session of redundant transmission, and the session is which one of a plurality of sessions of redundant transmission.

A person skilled in the art should understand that related descriptions of the foregoing data transmission apparatus in this embodiment of this application may be understood by making references to the related descriptions of the data transmission method in the embodiments of this application.

Figure 10:
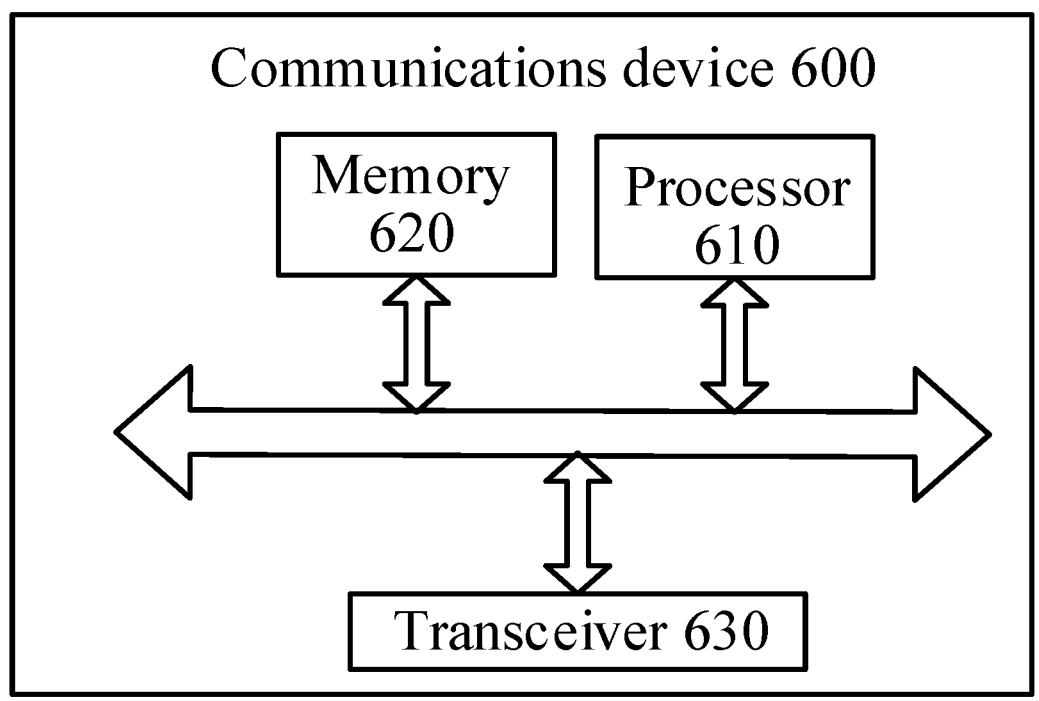
FIG. 10 is a schematic structural diagram of a communications device according to an embodiment of this application.

FIG. 10 is a schematic structural diagram of a communications device 600 according to an embodiment of this application. The communications device may be a terminal. The communications device 600 shown in FIG. 10 includes a processor 610. The processor 610 may invoke a computer program from a memory and run the computer program, to implement the method in the embodiments of this application.

Optionally, as shown in FIG. 10, the communications device 600 may further include a memory 620. The processor 610 may invoke the computer program from the memory 620 and run the computer program, to implement the method in the embodiments of this application.

The memory 620 may be a single component independent of the processor 610, or may be integrated into the processor 610.

Optionally, as shown in FIG. 10, the communications device 600 may further include a transceiver 630. The processor 610 may control the transceiver 630 to communicate with another device. Specifically, the transceiver 630 may send information or data to another device, or receive information of data sent by another device.

The transceiver 630 may include a transmitter and a receiver. The transceiver 630 may also further include antennas. There may be one or more antennas.

Optionally, the communications device 600 may specifically be a network device in this embodiment of this application, and the communications device 600 may implement corresponding procedures implemented by the network device in various methods in the embodiments of this application. For brevity, details are not described herein again.

Optionally, the communications device 600 may specifically be a mobile terminal/terminal in this embodiment of this application, and the communications device 600 may implement corresponding procedures implemented by the mobile terminal/terminal in various methods in the embodiments of this application. For brevity, details are not described herein again.

Figure 11:
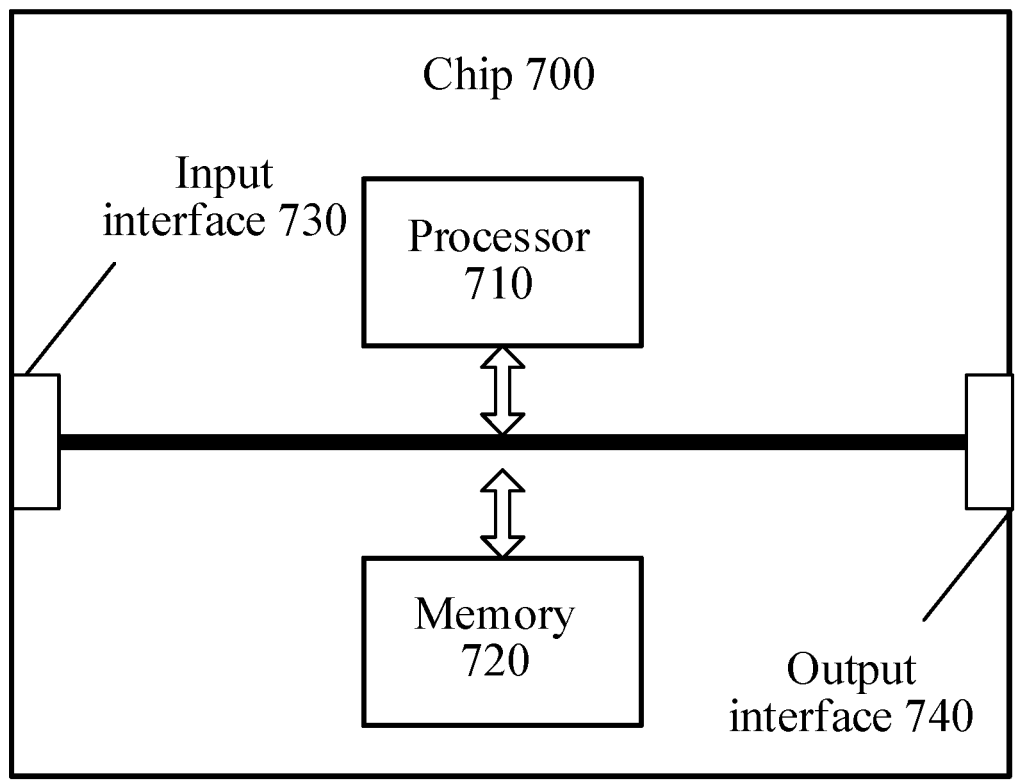
FIG. 11 is a schematic structural diagram of a chip according to an embodiment of this application.

FIG. 11 is a schematic structural diagram of a chip according to an embodiment of this application. The chip 700 shown in FIG. 11 includes a processor 710. The processor 710 may invoke a computer program from a memory and run the computer program, to implement the method in the embodiments of this application.

Optionally, as shown in FIG. 11, the chip 700 may further include a memory 720. The processor 710 may invoke the computer program from the memory 720 and run the computer program, to implement the method in the embodiments of this application.

The memory 720 may be a single component independent of the processor 710, or may be integrated into the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to the mobile terminal/terminal in the embodiments of this application, and the chip can implement corresponding procedures implemented by the mobile terminal/terminal in various methods in the embodiments of this application. For brevity, details are not described herein again.

It should be understood that, the chip mentioned in the embodiments of this application may also be referred to as a system-level chip, a system chip, a chip system, a system on chip, or the like.

Figure 12:
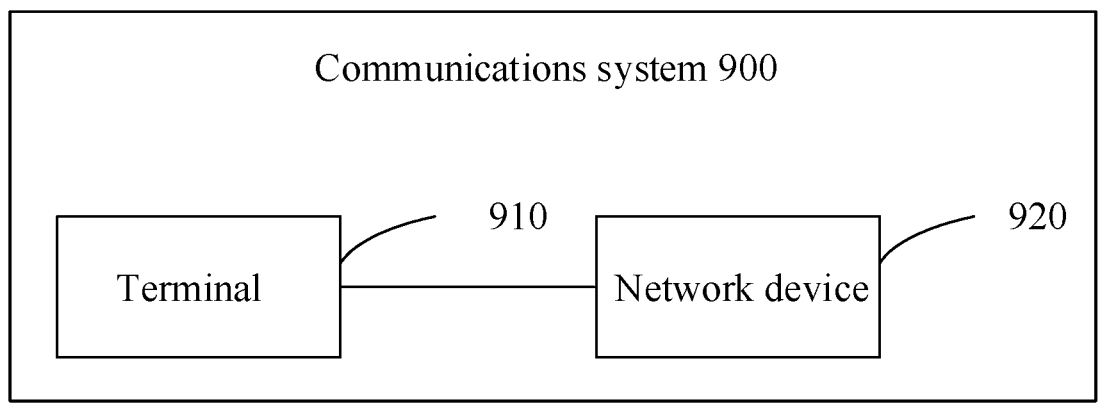
FIG. 12 is a schematic block diagram of a communications system according to an embodiment of this application.

FIG. 12 is a schematic block diagram of a communications system 900 according to an embodiment of this application. As shown in FIG. 12, the communications system 900 includes a terminal 910 and a network device 920.

The terminal 910 may be used for implementing corresponding functions implemented by the terminal in the foregoing method, and the network device 920 may be used for implementing corresponding functions implemented by the network device in the foregoing method. For brevity, details are not described herein again.

It should be understood that, the processor in this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by using a hardware decoding processor, or may be completed by using a combination of hardware and a software module in the decoding processor. The software module may be located in a mature storage medium in the art, such as a random access memory (RAM), a flash memory, a read-only memory (ROM), a programmable ROM (PROM), an electrically erasable PROM (EEPROM), or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a ROM, a PROM, an erasable PROM (EPROM), an EEPROM or a flash memory. The volatile memory may be a RAM, and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that, the memory for the system and the method described herein aims to include but not limited to these memories and any other suitable types of memories.

It should be understood that, the foregoing memory is an example but is not intended for limitation. For example, the memory in the embodiments of this application may alternatively be a SRAM, a DRAM, an SDRAM, a DDR SDRAM, an ESDRAM, an SLDRAM, a DR RAM, and the like. In other words, the memory in this embodiment of this application aims to include but is not limited to these memories and any other suitable type of memories.

The embodiments of this application further provide a computer-readable storage medium, configured to store a computer program.

Optionally, the computer-readable storage medium may be applied to the network device in the embodiments of this application, and the computer program causes a computer to perform corresponding procedures implemented by the network device in various methods in the embodiments of this application. For brevity, details are not described herein again.

Optionally, the computer-readable storage medium may be applied to the mobile terminal/terminal in the embodiments of this application, and the computer program causes a computer to perform corresponding procedures implemented by the mobile terminal/terminal in various methods in the embodiments of this application. For brevity, details are not described herein again.

An embodiment of this application further provides a computer program product, including a computer program instruction.

Optionally, the computer program product may be applied to the network device in the embodiments of this application, and the computer program instruction causes a computer to perform corresponding procedures implemented by the network device in various methods in the embodiments of this application. For brevity, details are not described herein again.

Optionally, the computer program product may be applied to the mobile terminal/terminal in the embodiments of this application, and the computer program instruction causes a computer to perform corresponding procedures implemented by the mobile terminal/terminal in various methods in the embodiments of this application. For brevity, details are not described herein again.

An embodiment of this application further provides a computer program.

Optionally, the computer program may be applied to the network device in the embodiments of this application, and when being run on a computer, the computer program causes the computer to perform corresponding procedures implemented by the network device in various methods in the embodiments of this application. For brevity, details are not described herein again.

Optionally, the computer program may be applied to the mobile terminal/terminal in the embodiments of this application, and when being run on a computer, the computer program causes the computer to perform corresponding procedures implemented by the mobile terminal/terminal in various methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, references may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a ROM, a RAM, a magnetic disk, or an optical disk.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a terminal, different UE Route Selection Policy URSP rules sent by a PCF network element, wherein traffic descriptors of the different URSP rules comprise different data network names DNNs allocated to a same piece of application data respectively; and
establishing, by the terminal, a plurality of redundant PDU sessions for the same piece of application data according to the traffic descriptors of the different URSP rules, wherein the plurality of redundant PDU sessions correspond to the different DNNs respectively;
wherein establishing, by the terminal, the plurality of redundant PDU sessions for the same piece of application data comprises:
when initiating establishment or modification of the plurality of redundant PDU sessions, sending, by the terminal, a first identifier to a network, wherein the first identifier comprises: an indication for whether the session is a session of redundant transmission and/or a path number of the redundant PDU sessions;
wherein, the plurality of redundant PDU sessions correspond to a same user module of the terminal, and the redundant transmission is performed on the same piece of application data through the plurality of redundant PDU sessions.

2. The method according to claim 1, wherein one or more RSDs under one traffic descriptor include one or more second parameters, where the second parameter is an attribute parameter of a session.

3. The method according to claim 2, wherein said second parameter is included in one RSD or the second parameter is included in a plurality of RSDs.

4. The method according to claim 3, wherein said second parameter is used for transmitting data flows under one traffic descriptor by using one or more sessions corresponding to the second parameter.

5. The method according to claim 4, wherein said one or more sessions corresponding to the second parameter refer to one or more sessions corresponding to a combination of the second parameter and a parameter in an RSD other than the RSD at which the second parameter is located.

6. A data transmission apparatus, the apparatus comprising:
- a receiving unit, configured to receive different UE Route Selection Policy URSP rules sent by a PCF network element, wherein traffic descriptors of the different URSP rules comprise different data network names DNNs allocated to a same piece of application data respectively; and
- a transmission unit, configured to establish a plurality of redundant PDU sessions for the same piece of application data according to the traffic descriptors of the different URSP rules, wherein the plurality of redundant PDU sessions correspond to the different DNNs respectively;
- wherein the transmission unit is further configured to: when initiating establishment or modification of the plurality of redundant PDU sessions, send a first identifier to a network, wherein the first identifier comprises: an indication for whether the session is a session of redundant transmission and/or a path number of the redundant PDU sessions;
- wherein, the plurality of redundant PDU sessions correspond to a same user module of the terminal, and the redundant transmission is performed on the same piece of application data through the plurality of redundant PDU sessions.

7. The data transmission apparatus according to claim 6, wherein one or more RSDs under one traffic descriptor include one or more second parameters, where the second parameter is an attribute parameter of a session.

8. The data transmission apparatus according to claim 7, wherein said second parameter is included in one RSD or the second parameter is included in a plurality of RSDs.

9. The data transmission apparatus according to claim 8, wherein said second parameter is used for transmitting data flows under one traffic descriptor by using one or more sessions corresponding to the second parameter.

10. The data transmission apparatus according to claim 9, wherein said one or more sessions corresponding to the second parameter refer to one or more sessions corresponding to a combination of the second parameter and a parameter in an RSD other than the RSD at which the second parameter is located.

* * * * *